(No Model.)
G. W. HAWXHURST.
HOLDBACK FOR VEHICLES.
No. 414,533. Patented Nov. 5, 1889.
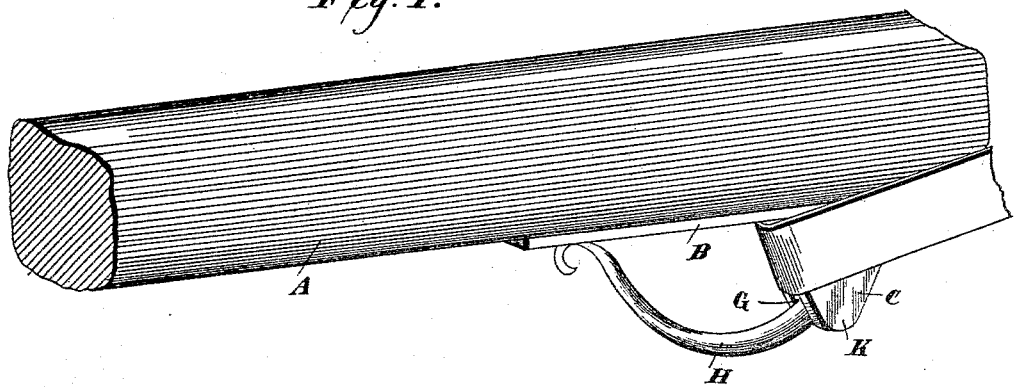
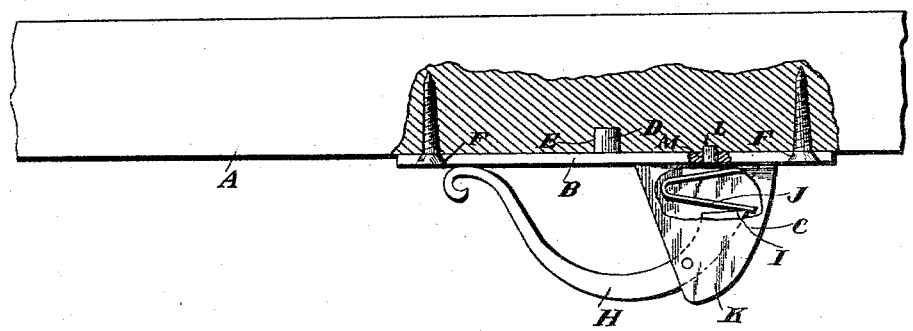
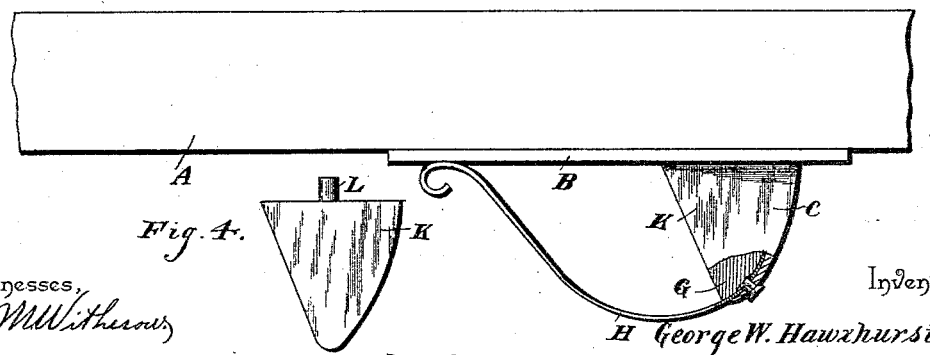
Witnesses,
J. M. Witherow
Inventor
George W. Hawxhurst,
By his Attorneys,
R. W. Bishop,
C. A. Snow & Co.

UNITED STATES PATENT OFFICE.

GEORGE W. HAWXHURST, OF PATERSON, NEW JERSEY.

HOLDBACK FOR VEHICLES.

SPECIFICATION forming part of Letters Patent No. 414,533, dated November 5, 1889.

Application filed July 31, 1889. Serial No. 319,251. (No model.)

*To all whom it may concern:*

Be it known that I, GEORGE W. HAWX-HURST, a citizen of the United States, residing at Paterson, in the county of Passaic and State of New Jersey, have invented a new and useful Holdback, of which the following is a specification.

My invention relates to improvements in holdbacks; and it consists in certain novel features hereinafter described and claimed.

In the accompanying drawings, Figure 1 is a perspective view of my improved holdback. Fig. 2 is a side elevation of the same with a part broken away. Fig. 3 is a similar view showing a modification. Fig. 4 is a detail view of the removable side of the casing.

The shaft A is of the usual construction, and on the under side of the shaft I secure a base-plate B, having a casing C projecting from its lower face. This base-plate is provided on its upper side with a spur D, which is adapted to engage a recess or socket E in the shaft, and the said base-plate is further provided at its ends with the openings F, through which securing-screws are passed into the shaft. The base-plate is thus firmly secured on the shaft and held to its place.

The casing C has one open side, and is provided with an opening G in its front edge, through which the holdback hook or lever projects. This hook or lever H is pivoted within the casing, and is extended beyond its pivot and provided with an angular end, as shown at I, and a spring J is arranged in the casing and bears on the said angular end of the hook to hold it normally against the base-plate. The open side of the casing is covered by a plate K, fitted to the casing and provided at its upper edge with a spur or point L, which passes through an opening M in the base-plate and enters a socket or recess in the under side of the shaft, so as to aid in holding the device to its place.

In practice the holdback-strap is engaged between the hook and base-plate and around the casing, and will operate in the usual manner. When it is desired to release the breeching-strap, the horse is driven forward from the shafts, and the strap is thus readily withdrawn. It will be observed that the spring holds the hook firmly against the base-plate, so that the accidental disengagement of the holdback is prevented.

In Fig. 3 I have shown a modification, in which, instead of the hook and the spring pressing thereon, as shown in the other figures and above described, I employ a hook constructed of a leaf-spring having one end secured rigidly within the casing and its other end bearing on the base-plate. This device will operate in the same manner as that first described, and may sometimes be preferred.

Having thus described my invention, what I claim, and desire to secure by Letters Patent, is—

1. As an improvement in holdbacks, the combination of the base-plate having a casing depending from its under side, the said casing having an open side and having its front edge forming a seat for the holdback-strap, a plate closing the open side of the casing and having a spur or point passing through an opening in the base-plate into the shaft, and the spring-hook secured within the casing and passing through the front edge of the same and bearing on the base-plate, as set forth.

2. As an improvement in holdbacks, the combination of the base-plate having a spur on its upper side engaging a recess in the shaft, and provided on its under side with a depending casing, the said casing having an open side and having its front edge forming a seat for the holdback-strap, the plate closing the open side of the casing and having a spur on its upper edge passing through an opening in the base-plate into the shaft, the hook pivoted within the casing and projecting through the front edge of the same and having an angular inner end, and the spring secured within the casing and bearing on the angular inner end of the casing, as specified.

In testimony that I claim the foregoing as my own I have hereto affixed my signature in presence of two witnesses.

GEORGE W. HAWXHURST.

Witnesses:
GEORGE W. HAWXHURST, Jr.,
CHARLES L. HENRY.